United States Patent
Brzozowski et al.

(10) Patent No.: US 6,868,724 B2
(45) Date of Patent: Mar. 22, 2005

(54) SEALED FUEL LEVEL SENSOR

(75) Inventors: Marc A. Brzozowski, Manchester, CT (US); Daniel A. Gilmour, Westford, CT (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 82 days.

(21) Appl. No.: 10/431,861

(22) Filed: May 8, 2003

(65) Prior Publication Data

US 2004/0221645 A1 Nov. 11, 2004

(51) Int. Cl.[7] ............................................. G01F 23/30
(52) U.S. Cl. ..................... 73/317; 73/290 R; 73/314; 73/305
(58) Field of Search .............................. 73/317, 290 R, 73/305, 314

(56) References Cited

U.S. PATENT DOCUMENTS

| | | | |
|---|---|---|---|
| 4,532,491 A | * 7/1985 | Rau et al. ..................... 338/33 |
| 4,679,580 A | 7/1987 | Devall et al. | |
| 4,920,797 A | 5/1990 | Swartz et al. | |
| 4,924,704 A | * 5/1990 | Gaston ......................... 73/317 |
| 5,150,615 A | 9/1992 | Rymut et al. | |
| 5,341,679 A | * 8/1994 | Walkowski et al. ........... 73/317 |
| 5,746,088 A | * 5/1998 | Sawert et al. ................. 73/317 |
| 5,798,640 A | 8/1998 | Gier et al. | |
| 5,814,830 A | 9/1998 | Crowne | |
| 6,070,337 A | 6/2000 | Wallrafen | |
| 6,209,392 B1 | 4/2001 | Rapaln | |
| 6,453,741 B1 | * 9/2002 | Beck, II ....................... 73/313 |
| 6,564,632 B2 | * 5/2003 | Ross, Jr. ....................... 73/317 |
| 6,588,288 B1 | * 7/2003 | Swindler ................... 73/866.1 |
| 6,658,934 B1 | * 12/2003 | Housey et al. ................ 73/317 |

FOREIGN PATENT DOCUMENTS

BR    PI 9202351-7 A    1/1994

* cited by examiner

Primary Examiner—Hezron Williams
Assistant Examiner—Rodney Frank
(74) Attorney, Agent, or Firm—Reising, Ethington, Barnes, Kisselle, P.C.

(57) ABSTRACT

A fuel level sensor that includes a housing having a cavity formed therein, and a resistor element disposed within the cavity for creating a signal that may be utilized to indicate a liquid fuel level within a fuel tank. A float lever is associated with the housing adjacent a first end and adjacent a second end with a float is responsive to the level liquid fuel in the fuel tank. The float lever includes a first magnet that is disposed adjacent to the housing. A wiper and contact assembly is positioned generally adjacent to the resistor element to generate a signal that may be used to indicate a liquid fuel level. The wiper and contact assembly includes a second magnet that is magnetically coupled with the first magnet so that movement of the float lever is translated to movement of the wiper and contact assembly.

20 Claims, 1 Drawing Sheet

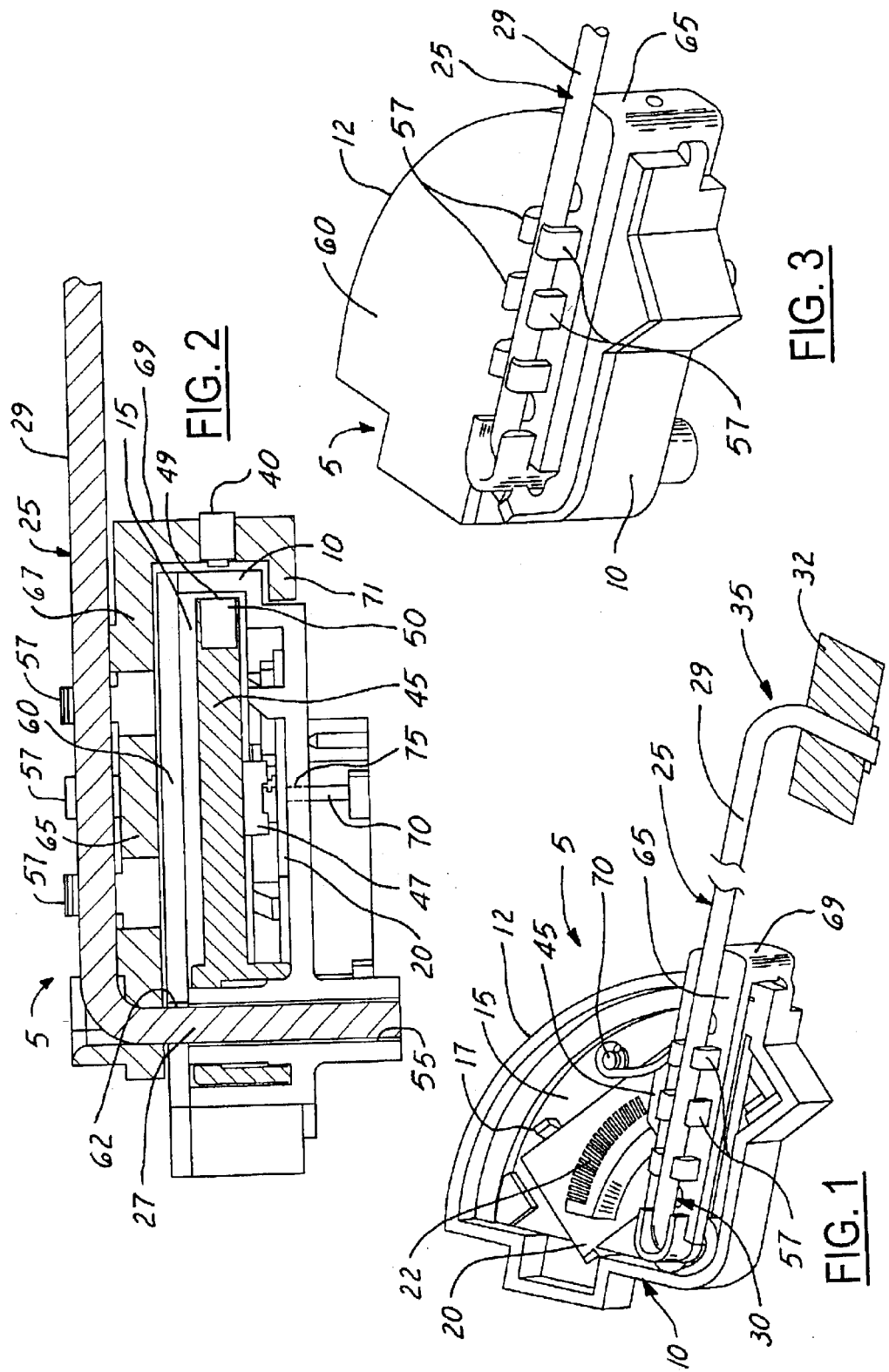

SEALED FUEL LEVEL SENSOR

FIELD OF THE INVENTION

This invention relates to liquid level sensors, and more particularly to fuel level sensors.

BACKGROUND OF THE INVENTION

Fuel level sensors are known for detecting the fuel level in gasoline tanks of automobiles. Generally, the fuel level sensors include a float that is connected to a contact member by an appropriate connecting structure. The contact member is mounted in relation to a resistor card that generally includes a conductive ink or layer for forming an electrical circuit with the contact member. As the level of fuel within a tank changes, the float member moves thereby causing the contact to move along a predefined path with respect to the resistor card which then sends a signal to a fuel level indicator.

In use, fuel level sensors generally known in the art, can fail as a result of either the contacts or the conductive ink contained on the resistor card reacting with the liquid fuel or byproducts or additives contained within the liquid fuel. In an effort to combat the failure of fuel level sensors, various manufacturers have designed contacts and resistors that include materials having an increased durability in the presence of a hostile fuel tank environment. Included in these materials are expensive precious metals such as platinum, gold, silver, and palladium, which can be combined into alloys that display increased corrosion resistance in a fuel environment. The cost of using such expensive alloy materials greatly contributes to the overall cost of a fuel level sensor.

In recent years, increased environmental legislation has resulted in gasoline and diesel hydrocarbon fuel formulations that vary geographically, as to their overall composition. For example, recent legislation has sought to reduce the sulfur content contained in automotive fuels by removing sulfur containing compounds, thus leaving behind residual traces of highly reactive sulfur compounds. These sulfur compounds are known to react with the precious metals contained in contacts or conductive inks, to form nonconducting deposits that may lead to sensor failure. Due to the ongoing environmental legislation, various fuel compositions unknown at this time could lead to failures in fuel sensors by the above-recited mechanisms.

SUMMARY OF THE INVENTION

A fuel level sensor with a resistor element and wiper and contact assembly positioned generally adjacent to the resistor element in a sealed housing for creating a signal that may be utilized to indicate a liquid fuel level within a fuel tank. A float lever is associated with the housing adjacent a first end and adjacent a second end with a float that is responsive to the level of the liquid fuel in the fuel tank. The float lever includes a first magnet that is disposed adjacent to the housing. The wiper and contact assembly includes a second magnet. The first and second magnets are magnetically coupled so that movement of the float lever in response to the level of fuel in the fuel tank is translated to movement of the wiper and contact assembly, relative to the resistor element. In this manner, a varying resistance indicative of a liquid fuel level is generated.

Objects, features and advantages of this invention include providing a fuel level sensor that is sealed with respect to the liquid fuel environment. In this manner, the wiper and contact assembly, as well as the resistor element may be protected from corrosive and damaging components such as the sulfur compounds previously described above.

Another advantage is that low cost wiper, contact and resistor elements may be utilized, as opposed to expensive precious metals, as the elements are not in contact with a corrosive fuel environment.

A further advantage is displayed through the use of a magnetic coupling, in which a contact assembly is sealed from the liquid fuel environment but may be moved inside the sealed housing by movement of a float external of the housing. In this manner, the sliding contact inside the sealed housing will act as if it were attached directly to a float thereby sending a varying resistance corresponding to a liquid fuel level.

The fuel level sensor of the present invention also is of a relatively simple design and economical manufacture and assembly, and in service has a long useful life. Other objects, features and advantages may be achieved, and a device may achieve all, some or none of the listed advantages without departing from the spirit and scope of the invention as set forth in the claims.

BRIEF DESCRIPTION OF THE DRAWINGS

These and other objects, features and advantages of the invention will become apparent from the following appended claims, detailed description of preferred embodiments, best mode, and accompanying drawings in which:

FIG. 1 is a perspective view of a fuel level sensor embodying this invention shown without a cover;

FIG. 2 is a sectional view showing the fuel level sensor with a cover attached; and FIG. 3 is a perspective view showing the fuel level sensor with the cover attached and sealed to the housing.

DETAILED DESCRIPTION OF THE PREFERRED EMBODIMENTS

As shown in FIGS. 1–3, a fuel level sensor 5 according to one presently preferred embodiment has a housing 10 with a cavity 15 formed therein and a resistor element 20 disposed within the cavity 15. A float lever 25 is associated with the housing 10 at a first end 30 of the lever 25 and coupled at a second end 35 to a float 32 that is responsive to the level of liquid fuel in a fuel tank. The float lever 25 preferably includes a lever body 65 which carries a first permanent magnet 40 (FIG. 2) disposed adjacent to the housing 10. A wiper and contact assembly 45 is positioned in relation to the resistor element 20 such that it may contact the resistor element 20 to provide a varying resistance signal indicative of a liquid fuel level as the wiper and contact assembly 45 travels relative to the resistor element 20. The wiper and contact assembly 45 preferably includes a second permanent magnet 50. The first 40 and second 50 magnets are arranged with adjacent poles of opposite polarity so that they are magnetically coupled so that movement of the float lever 25 and lever body 65 causes movement of the wiper and contact assembly 45 relative to the resistor element 20 to provide a varying resistance signal indicative of a liquid fuel level.

In the embodiment shown, the resistor element 20 is disposed within the cavity 15 and is preferably retained and mounted securely within the cavity 15 by snap retainers 17 as seen in FIG. 1. The resistor element 20 preferably comprises a thick film resistor having a network or array of conductors 22 formed on a durable substrate. Such thick film resistors are known in the art and may have substrates of, for example, ceramic material or porcelain coated steel for durability. The printed resistive region of the network of conductors 22 is contacted by the wiper and contact assembly as it moves across the array of conductors 45 to produce a resistance signal indicative of a liquid fuel level which varies in response to changes in the fuel level. Any of the resistor elements commonly utilized in the art may be utilized in the present invention. In a preferred aspect, the printed conductive area of the resistor element 20 is positioned on the substrate such that it extends out like the spokes of a wheel in an arc corresponding to the arc of movement of the contact assembly 45 as will be described below.

As seen in FIGS. 1 and 2, the housing 10 preferably includes a passage 55 for pivotally receiving the first end 30 of the float lever 25. As best seen in FIG. 2, the float lever 25 includes an angled portion 27 that is received within the passage 55 and securely retained therein such that the float lever 25 may pivot with respect to the housing 10 of the fuel level sensor 5. The angled portion 27 extends from a mid-portion 29 of the lever 25 at an angle of approximately 90°. The mid-portion 29 is connected to the float 32 that is deposited in the liquid fuel and is responsive to changes in the liquid fuel level. Movement of the float 32 in turn causes angular or pivotal movement of the float lever 25 with respect to the housing 10 in response to changes in the liquid fuel level.

As best seen in FIG. 2, the passage 55 that receives the angled portion 27 of the float lever is separated from the cavity 15 so that the cavity 15 may be separately sealed by a cover 60 attached and sealed to the housing 10 to prevent liquid fuel from contacting the resistor element 20 and the wiper and contact assembly 45. In this manner, the potentially damaging liquid fuel is isolated from the cavity 15 while other portions of the fuel level sensor 5, such as the passage 55, float lever 25, float 32, and lever body 65 pivotally attached to the housing 10, may be in contact with the liquid fuel.

As stated above, a first magnet 40 is associated with the float lever 25. In a preferred embodiment, the first magnet 40 is carried by a lever body 65 that is connected to the float lever 25 such as by pressing the lever 25 into a plurality of snap tabs 57 on the lever body 65 so that the lever 25 and lever body 65 move in unison. Other arrangements can be used, for example without limitation, the lever body 65 could itself be formed of a ferromagnetic material, or the magnet 40 may be carried by or otherwise associated or included with the lever 25. As shown in FIG. 2, the lever body 65 includes a first portion 67 positioned parallel to the mid-portion 29 of the float lever 25. The lever body 65 also includes an angled portion 69 that conforms to an arcuate portion 12 of the housing 10 and has a finger 71 underlying the housing 10. The float lever 25 is securely received within the lever body 65 such that the lever body 65 follows the pivotal movement of the float lever 25. In one preferred embodiment, the first magnet 40 is positioned in the angled portion 69 of the lever body 65 associated with the arcuate portion 12 of the housing 10.

Again, with reference to FIG. 2, a second magnet 50 is associated with the wiper and contact assembly 45 that is in juxtaposition with the resistor element 20 within the cavity 15. The wiper and contact assembly 45 preferably comprises a structure that is movable angularly or pivoted along generally the same axis of rotation as the angled portion 27 of the float lever 25 previously described. The wiper and contact assembly 45 includes contact elements 47 in a position corresponding to the arc of array of conductors 22 of the resistor element 20. The second magnet 50 is positioned at a free end 49 of the wiper and contact assembly 45, generally adjacent to the arcuate portion 12 of the housing 10. Hence, the first 40 and second 50 magnets are adjacent to each other and separated by the housing 10 in the area of the arcuate portion 12 of the housing 10. The first magnet 40 is outside of the cavity 15 and the second magnet 50 is inside the cavity 15. The first 40 and second 50 magnets are magnetically coupled such that movement of the float lever 25 is translated to movement of the wiper and contact assembly 45, moving the contact elements 47 relative to the conductors 22 thereby providing a varying resistance signal indicative of the liquid fuel level in a fuel tank.

In some applications it may be desirable to substitute a slug or body of ferromagnetic material such as iron for one of the magnets 40, 50 such as the second magnet 50.

As best seen in FIGS. 2 and 3, the cover 60 is attached to the housing 10 such that the cavity 15 containing the resistor element 20 is sealed from the liquid fuel environment. The cover 60 includes a hole 62 to allow for the angled portion 27 of the float lever 25 to pivotally engage the housing 10 as previously described. The cover 60 is preferably permanently attached to the housing 10 such that a seal may be assured throughout the life of the fuel level sensor 5.

In a preferred aspect of the present invention, the housing 10 and cover 60 preferably comprise a fuel resistant plastic such as acetyl polymer. Various joining processes such as laser welding, ultrasonic welding, heat plate joining, spin welding, or vibration welding may be utilized to join the housing 10 and cover 60 to form a permanent seal. It is to be understood that the housing 10 and cover 60 may also comprise alternative material such as glass materials or ceramic materials that may be permanently joined using various techniques commonly known in the art.

As best shown in FIG. 2, at least one electrical pin 70 is preferably connected to the resistor element 20 such that the varying resistance may be relayed to appropriate control structure for displaying a value on a fuel level indicator. Each electrical pin 70 is preferably disposed in a separate hole 75 formed in the housing 10 to allow for communication of the signal outside of the sealed cavity 15. In a preferred aspect, the holes 75 are sized to provide an interference fit with the electrical pins 70, thereby defining a seal of the electrical pins 70 with respect to the housing 10. In this manner, the cavity 15 containing the resistor element 20 and contact and wiper assembly 45 is permanently sealed from the liquid fuel environment by both the cover 60 as previously described, as well as around the electrical pins 70 ensuring a substantially, and preferably entirely liquid free environment within the cavity 15.

In use, the fuel level sensor 5 of the present invention provides a structure such that the resistor element 20 and contact and wiper assembly 45 are permanently sealed from a liquid fuel environment. The first magnet 40 associated with the float lever 25 interacts with the second magnet 50 associated with the wiper and contact assembly 45, to provide a magnetic coupling such that pivotal movement of the float lever 25 corresponding to changes in position of the float 32 disposed in the liquid fuel, moves the wiper and contact assembly 45 with respect to the resistor element 20 thereby providing a varying resistance that may be utilized by appropriate electric or electronic circuitry to indicate a liquid fuel level.

While a preferred embodiment is disclosed, a worker in this art would understand that various modifications would come within the scope and spirit of the invention as defined by the following claims.

What is claimed is:

1. A fuel level sensor, comprising:
   a housing having a cavity;
   a resistor element disposed in the cavity;
   a float lever associated with the housing adjacent a first end and with a float adapted to be disposed in liquid fuel adjacent a second end so that the lever is responsive to the level of liquid fuel;
   a first magnet associated with the float lever for movement with the float lever;
   a wiper and contact assembly in the cavity associated with the resistor element and movable relative to the resistor element to provide a varying resistance signal;
   a second magnet associated with the wiper and contact assembly and capable of being magnetically coupled with the first magnet so that movement of the float lever in response to a change in liquid fuel level is translated to movement of the wiper and contact assembly relative to the resistor element to provide a varying resistance signal indicative of a liquid fuel level.

2. The fuel level sensor of claim 1 further including a cover attached to the housing.

3. The fuel level sensor of claim 2 wherein the housing and cover are sealed together so that the cavity is at least substantially isolated from liquid fuel.

4. The fuel level sensor of claim 2 wherein the housing and cover comprise a fuel resistant plastic.

5. The fuel level sensor of claim 4 wherein the fuel resistant plastic comprises an acetyl polymer.

6. The fuel level sensor of claim 4 wherein the housing and cover are welded together.

7. The fuel level sensor of claim 1 wherein the housing further includes a channel for pivotally receiving the float arm.

8. The fuel level sensor of claim 1 wherein the float arm further includes a lever body attached to the float arm, and the first magnet is carried by the lever body.

9. The fuel level sensor of claim 1 which further comprises at least one electrical pin connected to the resistor element and wherein the housing has at least one hole formed therein to receive a corresponding electrical pin to permit a signal to be passed from the wiper and contact assembly in the cavity to a location outside of the housing.

10. The fuel level sensor of claim 9 wherein each of said at least one hole is sized such that one of said at least one electrical pin, when disposed in a corresponding hole, forms an interference fit with the housing.

11. The fuel level sensor of claim 1 wherein the first magnet is disposed outside of the housing, the second magnet is disposed in the cavity in the housing, and the first and second magnets are magnetically coupled together through the housing.

12. The fuel level sensor of claim 8 wherein the lever body and first magnet are disposed outside of the housing, and the wiper and contact assembly and the second magnet are disposed within the housing.

13. A fuel level sensor for a fuel tank comprising:
    a sealed housing constructed to be received in a fuel tank;
    a resistor element in the housing;
    a float lever having a first end and a second end, the float lever associated with the housing adjacent the first end;
    a float adjacent the second end of the lever and constructed to be disposed in liquid fuel so that the lever is responsive to the level of liquid fuel;
    a wiper and contact assembly disposed at least in part in the housing adjacent to the resistor element and having at least one contact engaging the resistor element;
    a first body comprising one of a ferromagnetic material and a magnet and the first body being associated with one of the float lever and the wiper and contact assembly;
    a second body comprising a magnet associated with the other of the float lever and the wiper and contact assembly; and
    the first and second bodies being magnetically coupled so that movement of the float lever in response to a change in liquid fuel level moves the wiper and contact assembly relative to the resistor element to provide a variable resistance indicative of a liquid fuel level.

14. The fuel level sensor of claim 13 wherein the first body comprises a ferromagnetic material.

15. The fuel level sensor of claim 13 which also comprises a cover attached and sealed to the housing so that the resistor element, wiper and contact assembly and first body are at least substantially isolated from liquid fuel.

16. The fuel level sensor of claim 15 wherein the housing of the cover comprises a fuel resistant plastic material.

17. The fuel level sensor of claim 16 wherein the housing and cover are heat welded together.

18. The fuel level sensor of claim 13 which also comprises a lever body attached to the float arm and the first body is carried by the lever body.

19. The fuel sensor of claim 13 which also comprises at least one electrical conductor pin connected to the resistor element, the housing having at least one hole therethrough to receive the electrical conductor pin to permit an electric signal to be passed from the wiper and contact assembly within the housing to a location outside of the housing.

20. The fuel sensor of claim 19 wherein the electrical conductor pin is received in the hole with an interference fit with the housing.

* * * * *